March 17, 1925.
C. E. OLIVER
1,530,398
SALT CRYSTALLIZING APPARATUS
Filed Aug. 6, 1921
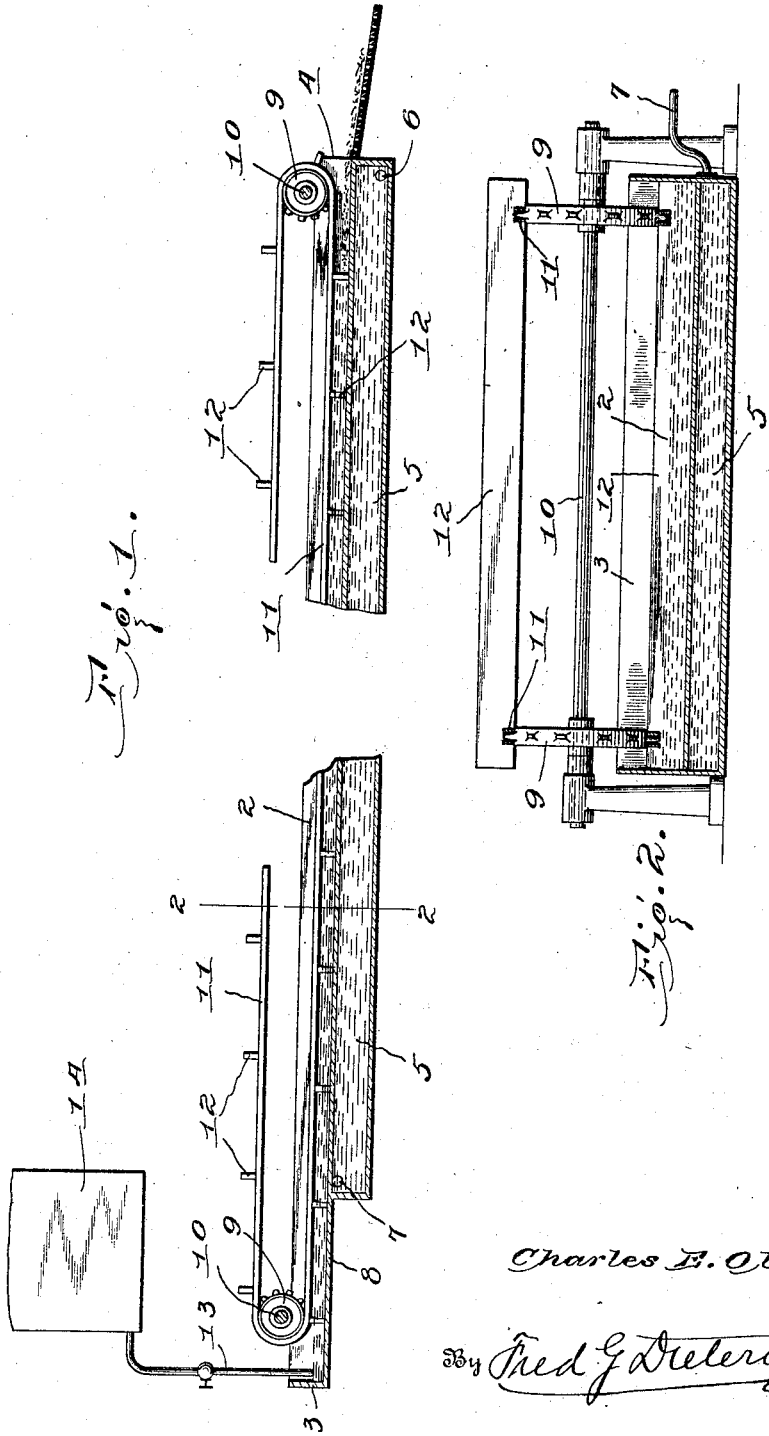
Inventor
Charles E. Oliver.
By Fred G. Dieterich & Co
Attorneys Patented Mar. 17, 1925.

1,530,398

UNITED STATES PATENT OFFICE.

CHARLES E. OLIVER, OF VANCOUVER, BRITISH COLUMBIA, CANADA.

SALT-CRYSTALLIZING APPARATUS.

Application filed August 6, 1921. Serial No. 490,279.

*To all whom it may concern:*

Be it known that I, CHARLES E. OLIVER, citizen of the Dominion of Canada, residing at Vancouver, in the Province of British Columbia, Canada, have invented certain new and useful Improvements in Salt-Crystallizing Apparatus, of which the following is a specification.

This invention relates to an apparatus for obtaining crystals of a salt from a concentrated solution of the same. It has been particularly designed to obtain the crystals of magnesium sulphate (Epsom salts) by a process that is practically continuous.

The invention is fully set forth in the following specification, reference being made to the drawings by which it is accompanied, in which:

Fig. 1 is a longitudinal section of the apparatus, and

Fig. 2, a cross section on the line 2—2 in Fig. 1.

In these drawings 2 respresents a relatively elongated, shallow trough or launder, one end 3 of which is walled to substantially correspond with the sides and the other end 4 is open. This trough 2 is of considerable length, and with the exception of a short distance 8 from the closed end 3, the bottom is provided with a water space, as at 5, the water entering at 6 adjacent the open end 4 and delivering at 7 adjacent the portion 8 of the trough below which there is no water space. The delivery pipe 7 is upturned to ensure that the jacket space 5 is retained full of water and that the water circulates in contact with the bottom of the trough.

A shaft 10 is rotatably mounted across the width of the trough 2 adjacent each end, the bearings of which shafts are preferably separate from the structure of the trough to avoid imparting vibration to it.

On each shaft 10 a sprocket wheel 9 is secured toward each side of the trough, around which sprockets endless chains 11 pass along each side. Cross bars 12 are secured at intervals apart across the sprocket chains 11, the length of which bars conform closely to the width of the trough 2 between its sides, and their depth is such as to fit closely against the bottom of the trough. These chains 11 are slowly moved along the length of the trough from the end 3 to 4 by power applied from any convenient source to one of the transverse shafts 10. The cross bars 12 thus form partitions dividing the trough into separate compartments of definite length, which compartments travel slowly along the length of the trough from the closed end 3 toward the open end 4.

Into the closed end 3 of this trough a concentrated solution of the salt to be crystallized is delivered at 13 from a receptacle 14, where the solution is maintained under conditions of temperature, etc., preventing crystallization. As the liquor is delivered into that end 8 of the trough, which is not exposed to the water cooling, the liquid attains the required condition of quiescence before it is slowly moved by the cross partitions 12 of the chain over the water cooled portion of the trough, and is slowly progressed along it toward the delivery end 4.

The liquid between the several cross bars 12 is thus brought gradually under the cooling influence of the water cooled bottom, passing first over that end of it from which the water is delivered at 7 and finally at the end 4, coming under the influence of the lower temperature where the water is admitted at 6.

It must be distinctly understood that the function of the partitions 12 of the chains is not that of scrapers, removing the crystals from the bottom of the trough, but, as described, they serve as partitions of compartments, each of which conveys a certain volume of the saturated solution along the trough where it is exposed to a gradually decreasing temperature for a sufficient length of time to satisfy the requirements of crystallization, which time is determined by the length of the trough and the rate of movement of the chain.

That the crystals are not scraped from the trough is evidenced by the fact that they are not crowded against the after cross bar 12 of each compartment, but are formed in the body of the solution in a similar manner to what they would do were the volume detached and stationary. There is a slight crowding of the crystals against the after bar 12 of each compartment as they approach the delivery end 4, but not while they are forming.

At the delivery end 4 the mother liquor is strained from the crystals and returned for further use in the process, and the crystals are dried and passed for such further treatment as may be necessary for packing and shipment.

It is not necessary that the cross bars 12 should fit tightly within the sides and bottom of the trough as there is no material difference in pressure on each side of the cross bars to cause leakage from one compartment to the other.

The length of that portion 8 of the trough which extends beyond the water cooled bottom 5, is such, in relation to the distance apart of the bars 12, on the conveyor chains, that the following bar of each compartment is projected into the trough and cuts off that compartment from the agitation of the inflowing liquor at 13 and thus enables the liquor in that compartment to attain quiescence before it is slowly moved over that portion of the trough which is water cooled. This constitutes an important feature of the invention.

Having now particularly described my invention, I hereby declare that what I claim as new and desire to be protected in by Letters Patent, is:

1. An apparatus for the crystallization of a salt from a saturated solution of the same, said apparatus comprising a trough open at one end and closed at the other end, an endless conveyor extending the length of the trough, said conveyor having cross bars which fit between the sides and engage the bottom of the trough and so divide the length of the trough into a series of separate compartments, means for moving this conveyor, means for delivering a solution of the salt into the closed end of the trough, and means for cooling the trough.

2. An apparatus for the crystallization of a salt from a saturated solution of the same, said means consisting of a trough open at one end and closed at the other end, means for dividing the length of the trough into a series of separate compartments, means for moving the compartments along the length of the trough from the closed to the open end, means at the closed end for delivering a solution of the salt into the trough, and means for cooling the bottom of the trough which is toward the open end.

3. An apparatus for the crystallization of a salt from a saturated solution of the same, said apparatus comprising a trough open at one end and closed at the other end, said trough having a water space extending along the bottom from the open end to adjacent the closed end, means for delivering water into this space adjacent the open end, means for delivering the water from the space adjacent the closed end of the trough, an endless conveyor extending the length of the trough, said conveyor having cross bars which closely fit between the sides and engage the bottom of the trough and so divide the length of the trough into a series of separate compartments, means for moving this conveyor, and means for delivering a solution of the salt into the closed end of the trough the depth of said cross bars being substantially equal to the depth of the liquid delivered into the compartments.

4. An apparatus for the crystallization of a salt from a saturated solution of the same, said apparatus comprising the combination with a trough having a closed end and an open end, of a conveyor moving endwise of the trough from adjacent the closed to adjacent the open end, said conveyor having transverse partitions fitting to the sides and bottom of the trough and dividing it lengthwise into a series of movable compartments, means for cooling the trough, said means commencing from a distance from the closed end exceeding the distance apart of the compartment divisions of the conveyor and terminating adjacent the open end of the trough, means adjacent the closed end for delivering into the trough a solution of the salt to be crystallized, and means for delivering the mother liquor and crystals at the open end the depth of transverse bars being substantially not less than the depth of the liquid delivered into the compartments.

In testimony whereof I affix my signature.

CHARLES E. OLIVER.